(12) United States Patent
Noh (10) Patent No.: US 7,078,131 B2
(45) Date of Patent: Jul. 18, 2006

(54) POLYMERIC SOL ELECTROLYTE AND LITHIUM BATTERY USING THE SAME

(75) Inventor: Hyung-gon Noh, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 349 days.

(21) Appl. No.: 10/202,060

(22) Filed: Jul. 25, 2002

(65) Prior Publication Data

US 2003/0059681 A1 Mar. 27, 2003

(30) Foreign Application Priority Data

Aug. 17, 2001 (KR) .............................. 2001-49594

(51) Int. Cl.
*H01M 6/18* (2006.01)
(52) U.S. Cl. ...................... 429/306; 429/309; 429/314; 429/317; 429/322; 429/303; 429/300; 252/62.2
(58) Field of Classification Search ................ 429/309, 429/306, 314, 317, 322, 303, 300; 252/62.2
See application file for complete search history.

(56) References Cited

U.S. PATENT DOCUMENTS 6,033,797 A 3/2000 Mao et al.
6,420,072 B1 * 7/2002 Maruyama et al. ......... 429/309
6,841,303 B1 * 1/2005 Park et al. ................... 429/303
2003/0104282 A1 * 6/2003 Xing et al. .................. 429/303

FOREIGN PATENT DOCUMENTS

| JP | 10-241731 | | 9/1998 |
| JP | 11-288738 | * | 10/1999 |
| JP | 2000-058114 | | 2/2000 |
| JP | 2001185216 | * | 7/2001 |
| KR | 2000-48201 | | 7/2000 |

* cited by examiner

*Primary Examiner*—Laura Weiner
(74) *Attorney, Agent, or Firm*—Stein, McEwen & Bui, LLP (57) ABSTRACT

A polymeric sol electrolyte including a sol-forming polymer and an electrolytic solution consisting of a lithium salt and an organic solvent. Use of the polymeric sol electrolyte allows problems such as swelling or leakage to be overcome, compared to the case of using a liquid-type electrolytic solution. Also, the polymeric sol electrolyte has better ionic conductivity than a polymeric gel electrolyte. In addition, when the lithium battery according to the present invention is overcharged at 4.2 V or higher, an electrochemically polymerizable material existing in the polymeric sol electrolyte is subjected to polymerization to prevent heat runaway, which simplifies a separate protection circuit, leading to a reduction in manufacturing cost.

15 Claims, 3 Drawing Sheets

POLYMERIC SOL ELECTROLYTE AND LITHIUM BATTERY USING THE SAME

CROSS-REFERENCE TO RELATED APPLICATION

This application claims the benefit of Korean Application No. 2001-49594, filed Aug. 17, 2001, in the Korean Intellectual Property Office, the disclosure of which is incorporated herein by reference.

BACKGROUND OF THE INVENTION

1. Field of the Invention

The present invention relates to a polymeric sol electrolyte and a lithium battery using the same, and more particularly, to a polymeric sol electrolyte having improved reliability and safety and a lithium battery using the same.

2. Description of the Related Art

Together with the recent development of miniaturized electronic devices, there is an increasing demand for small, lightweight batteries used to supply power to such devices. Although small, lightweight batteries, such as lithium batteries, have already been put into practice in the field of primary batteries, those primary batteries, which are not rechargeable, are restrictively used because they cannot be repeatedly used.

Secondary batteries that have been conventionally developed and used include Pb storage batteries, Ni—Cd storage batteries or Ni-MH storage batteries. However, it is quite difficult to achieve miniaturization of these batteries. Thus, lithium ion batteries that can be miniaturized and are capable of charging and discharging with high capacity, have recently gained commercial popularity for use in portable electrically powered devices and telecommunications devices, such as, for example, small-sized video cameras, mobile phones, notebook-type personal computers and the like. Lithium ion batteries have carbon compounds, capable of occluding or releasing lithium ions, for anode active materials, and lithium-transition metal oxides, such as $LiCoO_2$, $LiNO_2$, $LiMn_2O_4$, or $LiFeO_2$, for cathode active materials.

However, when a lithium ion battery is overcharged, excess lithium ions are released from a cathode and migrate to an anode, so that the cathode and the anode become thermally unstable. When the cathode and the anode are thermally unstable, an organic solvent, particularly a carbonate-based organic solvent in an electrolytic solution, begins to decompose at 5 volts or higher. Decomposition of an electrolytic solution causes heat runaway, so that the battery may combust, swell or rupture. To solve these disadvantages, methods including addition of an overcharge polymerization additive to an electrolytic solution, and internal polymerization of a battery by adding a polymerizable material to an electrolytic solution, have been proposed. Examples of these methods are disclosed in Japanese Patent Publication No. hei 2000-58114, U.S. Pat. No. 6,033,797 and Japanese Patent Publication No. hei 10-241731.

Although the above-noted conventional methods are desirably used to protect batteries in an overcharge condition, deterioration in the reliability of a battery may occur, in view of cycle or retention characteristics.

SUMMARY OF THE INVENTION

To solve the above and other problems, it is an object of the present invention to provide a polymeric sol electrolyte having improved reliability and safety.

It is another object of the present invention to provide a lithium battery having improved reliability and safety during overcharge by using the polymeric sol electrolyte.

Additional objects and advantages of the invention will be set forth in part in the description which follows and, in part, will be obvious from the description, or may be learned by practice of the invention.

The foregoing and other objects of the present invention are achieved by providing a polymeric sol electrolyte comprising: a sol-forming polymer; and an electrolytic solution including a lithium salt and an organic solvent.

The foregoing and other objects of the present invention may also be achieved by providing a lithium battery including a cathode, an anode, and a polymeric sol electrolyte interposed between the cathode and the anode and having a sol-forming polymer and an electrolytic solution including a lithium salt and an organic solvent.

According to an aspect of the invention, the polymeric sol electrolyte further includes an electrochemically polymerizable material polymerized at 4.2 to 6 V.

According to another aspect of the invention, the electrochemically polymerizable material is at least one selected from the group consisting of 3,4-methylenedioxyacetophene, 1,4-benzodioxan-6-yl methylketone, o-terphenyl, o-benzylbiphenyl, p-benzylbiphenyl, diphenyleneoxide, hydrogenated o-terphenyl and biphenyl. Also, the content of the electrochemically polymerizable material is in the range of 0.1 to 10 parts by weight, based on 100 parts by weight of the polymeric sol electrolyte according to an aspect of the invention.

According to a further aspect of the invention, the content of the electrolytic solution is in the range of 50 to 99.9 parts by weight, based on 100 parts by weight of the polymeric sol electrolyte.

According to yet another aspect of the invention, the thermo polymerizable material includes mixtures of epoxy-based resins and amine compounds, acryl-based resins and urethane-based resin precursors.

According to still another aspect of the invention, the epoxy-based resins include epichlorohydrin-polyglycol epoxy resins, and the amine compounds include at least one selected from the group consisting of diethyl triamines, hexamethyldiamine and monomers having two or more amine groups.

According to still yet another aspect of the invention, the urethane-based resin precursors include a mixture of 1,6-diisocyanatohexane and polyethyleneglycol, and a mixture of 1,4-diisocyanatohexane and polyethyleneglycol, and the acryl-based resin is at least one selected from the group consisting of polyethyleneglycol diacrylate and polyethyleneglycol dimethacrylate.

The foregoing and other objects of the present invention may also be achieved by providing a method of preparing a lithium battery including: interposing a separator made of microporous polyolefin between a cathode and an anode to form an electrode assembly; accommodating the electrode assembly in a battery case; injecting a mixture of a thermopolymerizable material as a sol-forming polymer precursor and an electrolytic solution, into the battery case in which the electrode assembly is accommodated to form a resultant product; and heating the resultant product to form a sol-forming polymer and then to form a polymeric electrolyte comprising the sol-forming polymer and the electrolytic solution, and hermetically sealing the resultant product.

The foregoing and other objects of the present invention may also be achieved by providing a method of preparing a lithium battery comprising: coating at least one surface of a cathode and an anode with a polymeric electrolyte composition comprising a thermopolymerizable material as a sol-forming polymer precursor and an electrolytic solution consisting of a lithium salt and an organic solvent, and heating the resultant to prepare a polymeric sol electrolyte; and interposing the polymeric sol electrolyte between the cathode and the anode to prepare an electrode assembly and accommodating the electrode assembly in a battery case, and then hermetically sealing the battery assembly in which the electrode assembly is accommodated.

According to a further aspect of the invention, the heating to form the polymeric sol electrolyte is performed at or between 40 and 100° C.

According to yet a further aspect of the invention, the methods of preparing a lithium battery further include adding an electrochemically polymerizable material polymerized at the maximum operating voltage or higher (i.e., at 4.2 to 6 V).

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Reference will now be made in detail to the embodiments of the present invention, examples of which are illustrated in the accompanying drawings and in specific examples, wherein like reference numerals refer to the like elements throughout. The embodiments are described below in order to explain the present invention by referring to the figures.

The present invention is directed to a polymeric sol electrolyte having a sol-forming polymer and an electrolytic solution by adding a thermopolymerizable material to an electrolytic solution generally used for lithium batteries or further adding a material that is electrochemically polymerized at 4.5–6 V to the thermopolymerizable material. As used herein, the term "sol" means a suspension having fluidity by colloidal particles dispersed in a liquid.

As described above, in the case of a sol-type electrolyte, the reliability of a lithium battery is improved and the safety thereof is ensured by polymerization of electrochemically polymerizable materials when the battery is overcharged.

The sol-forming polymer is a polymer capable of forming sol by impregnating an electrolytic solution therein and preferably has a weight-average molecular weight of 500 to 100,000. The sol-forming polymer becomes a gel-state in a higher impregnation concentration of an electrolytic solution. The sol-forming polymer becomes a sol-state in a lower impregnation concentration of an electrolytic solution (that is, an amount of the sol-forming polymer is 2 parts by weight or less based on 10 parts by weight of electrolytic solution), and can be obtained by polymerizing a mixture of an epoxy-based resin and amine compounds, or acryl-based resins, or urethane-based resin precursors.

A method of preparing a polymeric sol electrolyte according to an embodiment of the present invention will now be described.

First, a thermopolymerizable material as a sol-forming polymer precursor, and an electrolyte comprising a lithium salt and an organic solvent, are mixed to form a polymeric electrolyte composition. An electrochemically polymerizable material that can be polymerized at over the maximum operating voltage of a battery may be further added to the composition.

Then, a support film is coated with the obtained polymeric electrolyte composition and heated, followed by delaminating the resultant film from the support film, thereby preparing a polymeric sol electrolyte. Usable support films include any film that can support a polymeric electrolyte, for example, a polyethylenetephthalate substrate, a mylar film or a glass substrate.

The heating temperature for the thermal polymerization is preferably in the range of 20 to 90° C. If the polymerization temperature is lower than 20° C., the polymerization reaction does not occur. If the polymerization temperature is higher than 90° C., the battery performance is deteriorated.

Usable thermopolymerizable materials include mixtures of epoxy-based resins and amine compounds, acryl-based resins or urethane-based resin precursors.

Examples of the epoxy-based resins include epichlorohydrin-polyglycol epoxy resins represented by the formula 1 infra. Amine compounds reacting with the epoxy-based resins include diethyl triamine represented by the formula 2 and hexamethyldiamine. The epoxy-based resins and amine compounds are polymerized when epoxy groups of the epoxy-based resins are attacked by amine groups of the amine compounds to cause ring-opening of the epoxy groups, producing corresponding sol-forming polymers.

Formula 1 wherein n is an integer of 2 to 20, and preferably 2 to 10.

Formula 2

Examples of the acryl-based resins include polyethyleneglycoldiacrylate (PEGDA), and polyethyleneglycoldimethacrylate. If these acryl-based resins are polymerized in the presence of a catalyst such as azoisobutyronitrile (AIBN), reactions between unsaturated groups in the acrylate-based resin occur, producing corresponding sol-forming polymers.

The urethane-based resin precursors are exemplified by a mixture of 1,6-diisocyanotohexane and polyethyleneglycol or a mixture of 1,4-diisocyanotohexane and polyethyleneglycol, and produce urethane-based resins by polymerization in the presence of an Sn catalyst, followed by reactions between unsaturated groups in the urethane-based resins, to produce corresponding sol-forming polymers.

The thermopolymerizable material used in the present invention is an urethane-based resin precursor rather than an urethane-based resin, because use of an urethane-based resin increases the viscosity of a composition containing the same, making it difficult to inject the composition into a battery.

The total content of the thermopolymerizable material is preferably in the range of 0.1 to 10 parts by weight, based on 100 parts by weight of a polymeric electrolyte. If the total content of the thermopolymerizable material is out of the above range, a sol-type polymeric electrolyte is difficult to attain.

The electrochemically polymerizable material forming the polymeric electrolyte composition of the present invention is an additive to prevent overcharge, and is polymerized at 4.5 to 6 V, as confirmed by cyclovoltametry.

Examples of the electrochemically polymerizable material include at least one selected from the group consisting of 3,4-methylenedioxyacetophene represented by the formula 3 infra, 1,4-benzodioxan-6-yl methylketone represented by the formula 4 infra, o-terphenyl, o-benzylbiphenyl, p-benzylbiphenyl, diphenyleneoxide, hydrogenated o-terphenyl and biphenyl. The content of the electrochemically polymerizable material is preferably in the range of 0.1 to 10 parts by weight, based on 100 parts by weight of a polymeric electrolyte. If the content of the electrochemically polymerizable material is greater than 10 parts by weight, the effect of improving the safety of a battery is negligible. If the content of the electrochemically polymerizable material is less than 0.1 parts by weight, the battery performance is undesirably reduced.

Formula 3

Formula 4

In the present invention, the content of an electrolytic solution is preferably in the range of 50 to 99.9 parts by weight, based on 100 parts by weight of a polymeric electrolyte. The polymeric electrolyte has good ionic conductivity within this range.

The electrolytic solution of the present invention consists of a lithium salt and an organic solvent, and the concentration thereof is preferably in the range of 0.2 to 1.5 M. Usable examples of the lithium salt include at least one selected from the group consisting of lithium perchlorate ($LiClO_4$), lithium tetrafluoroborate ($LiBF_4$), lithium hexafluorophosphate ($LiPF_6$), lithium trifluoromethansulfonate ($LiCF_3SO_3$) and lithium bistrifluoromethyansulfonylamide (LiN($CF_3SO_2$)$_2$). Usable examples of the organic solvent include at least one selected from the group consisting of propylene carbonate (PC), ethylene carbonate (EC), ethylmethyl carbonate (EMC), dimethyl carbonate (DMC), diethyl carbonate (DEC), ethylmethyl carbonate (EMC), and fluorinated benzene (FB).

To promote polymerization of the thermopolymerizable material, a thermopolymerization initiator and/or a polymerization catalyst may be further added to the polymeric electrolyte composition of the present invention. The thermopolymerization initiator is exemplified by AIBN, and the polymerization catalyst is exemplified by tributyl tin diacetate.

The content of the thermopolymerization initiator and/or polymerization catalyst is preferably in the range of 1 to 10 parts by weight, based on 100 parts by weight of the thermopolymerizable material, from the viewpoint of polymerization reactivity.

A method of preparing a lithium polymer battery according to an embodiment of the present invention will now be described.

First, a cathode and an anode are prepared by a general method of manufacturing a lithium battery. Here, a lithium metal composite oxide, a transition metal compound or a sulfur compound is used as a cathode active material, and metallic lithium, a carbonaceous material or graphite is used as an anode active material.

A separator having a network structure and made of microporous olefin is interposed between the prepared cathode and anode, followed by winding or stacking of the resultant structure, forming a battery assembly.

Then, the formed battery assembly is accommodated in a battery case. Next, a polymeric electrolyte composition comprising a thermopolymerizable material and an electrolytic solution or comprising a thermopolymerizable material, and an electrolytic solution and an electrochemically polymerizable material, is injected into the battery case accommodating the battery assembly, to impregnate the polymeric electrolyte composition into the separator having a network structure. Injection of a polymeric electrolyte composition is preferably carried out under reduced pressure.

The resultant structure is hermetically sealed and heated at 40 to 100° C. for polymerization, thereby completing a polymeric sol electrolyte and a lithium battery using the same.

Alternatively, a lithium battery can be manufactured as follows. At least one surface of a cathode and an anode is coated with a polymeric electrolyte composition comprising a thermopolymerizable material as a sol-forming polymer precursor and an electrolytic solution consisting of a lithium salt and an organic solvent, and heated, preparing a polymeric sol electrolyte. Then, the cathode and the anode, with the polymeric sol electrolyte interposed therebetween, are accommodated in a battery case, and hermetically sealed, thereby completing the lithium battery.

The lithium batteries prepared by the above-described methods, both having a sol-type polymeric electrolyte, have superb reliability, compared to lithium batteries having gel-type polymeric electrolytes. In the case where the electrolytic solution of the polymeric electrolyte contains an electrochemically polymerizable material, when the voltage of a battery becomes in the range of 4.5 to 6 V due to overcharge, the safety of the battery can be ensured by polymerization of the electrochemical polymerizable material.

Figure 4:
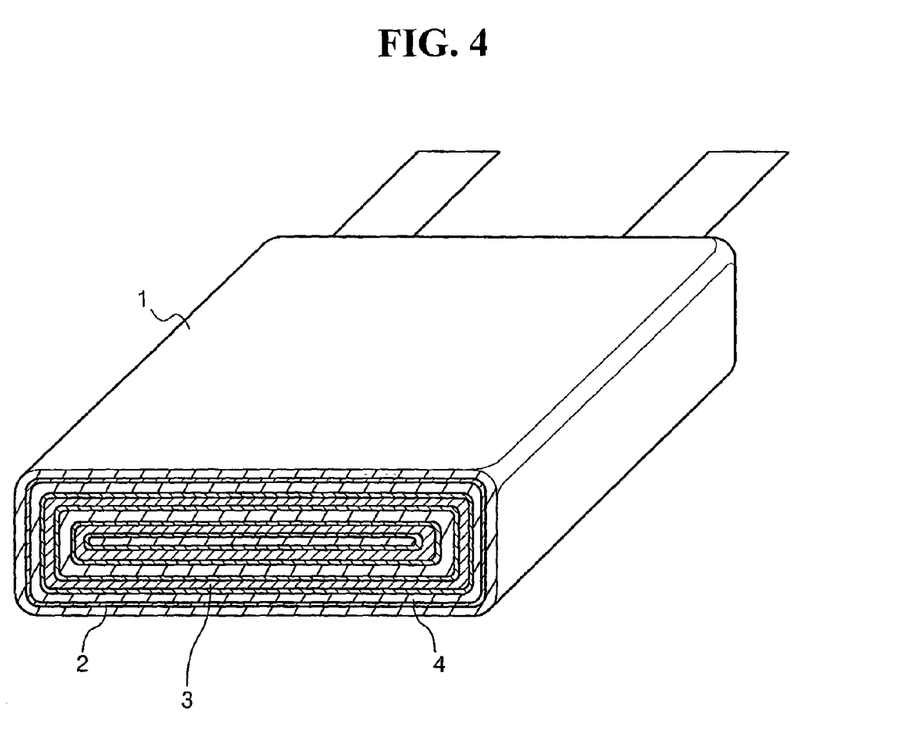
FIG. 4 shows a lithium battery according to an embodiment of the present invention.

As shown in FIG. 4, a lithium-sulfur battery according to an embodiment of the present invention includes a case 1 containing a positive electrode (i.e., a cathode) 3, a negative electrode (i.e., an anode) 4, and a separator 2 interposed between the positive electrode 3 and the negative electrode 4. The sol-type polymeric electrolyte solution is disposed between the positive and negative electrodes 3, 4.

The lithium batteries according to the embodiments of the present invention include, but are not specifically limited thereto, lithium primary batteries and all kinds of lithium secondary batteries, for example, lithium ion polymer batteries and lithium ion batteries.

The present invention will now be described through the following examples and is not limited thereto.

EXAMPLE 1

94 g of $LiCoO_2$, 3 g of Super P conductive carbon (available from MMM CARBON, Belgium), 3 g of polyvinylidenefluoride (PVDF) were dissolved in 500 g of N-methylpyrrolidone (NMP) to produce a cathode active material composition. Then, an aluminum (Al) foil was coated with the cathode active material composition and dried to prepare a cathode.

89.8 g of mezocarbon fiber (available from PETCOA, LTD. ), 0.2 g of oxalic acid and 10 g of PVDF were dissolved in 500 g of NMP to produce an anode active material composition. Then, a copper (Cu) foil was coated with the anode active material composition and dried to prepare an anode.

A polyethylene separator (available from ASAHI CO.) having a width of approximately 5.35 cm and approximately 18 μm was interposed between the cathode and the anode. The resultant structure was accommodated in a battery case and then the obtained polymeric electrolyte composition was injected into the battery case.

The polymeric electrolyte composition was prepared by mixing 2.5 g of an epichlorohydrin polyglycol epoxy resin and 2.5 g of diethyl triethylamine, 3 g of 3,4-methylenedioxy-acetophenone with 100 g of an electrolytic solution. Here, an EC/EMC/PC/FB electrolytic solution mixed in a volume ratio of 30:55:5:10 was used as the electrolytic solution. Then, the resultant product was hermetically sealed and heated at 80° C. for 3 hours for hardening, thereby completing a polymeric sol electrolyte and a lithium polymer battery.

EXAMPLE 2

A lithium secondary battery was prepared in the same manner as in Example 1, except that 2 g of epichlorohydrin polyglycol epoxy resin and 1 g of diethyl triethylamine were used in preparing a polymeric electrolyte composition.

EXAMPLE 3

A lithium secondary battery was prepared in the same manner as in Example 1, except that 1.5 g of epichlorohydrin polyglycol epoxy resin and 1.5 g of diethyl triethylamine were used in preparing a polymeric electrolyte composition.

EXAMPLE 4

A lithium secondary battery was prepared in the same manner as in Example 1, except that 1 g of epichlorohydrin polyglycol epoxy resin and 2 g of diethyl triethylamine were used in preparing a polymeric electrolyte composition.

EXAMPLE 5

A polymeric electrolyte composition was prepared by mixing 0.1 g of 1,6-diisocyanatohexane, 0.1 g of polyethyleneglycol dimethacrylate (PEGDA) and 0.005 g of AIBN with 2.9 g of an electrolytic solution 1.15 M $LiPF_6$ mixed with EC/EMC/DEC in a volume ratio of 3:3:4. Then, polymerization was carried out at 80° C. for 3 hours, thereby completing a lithium polymer battery.

EXAMPLE 6

A polymeric electrolyte composition was prepared by mixing 0.1 g of polyethyleneglycol having a weight average molecular weight of 400 and 0.05 g of tributyl tin diacetate with 2.9 g of an aqueous solution of 1.15 M $LiPF_6$ mixed with EC/EMC/DEC in a volume ratio of 3:3:4. Then, polymerization was carried out at 80° C. for 2 hours, thereby completing a lithium secondary battery.

EXAMPLE 7

A lithium secondary battery was prepared in the same manner as in Example 1, except that o-terphenyl was used in preparing a polymeric electrolyte composition, instead of 3,4-methylenedioxy-acetophenone.

EXAMPLE 8

A lithium secondary battery was prepared in the same manner as in Example 1, except that 1,4-benzodioxan-6-yl methyketone was used in preparing a polymeric electrolyte composition, instead of 3,4-methylenedioxyacetophenone.

EXAMPLE 9

A lithium secondary battery was prepared in the same manner as in Example 1, except that p-benzylbiphenyl was used in preparing a polymeric electrolyte composition, instead of 3,4-methylenedioxyacetophenone.

EXAMPLE 10

A lithium secondary battery was prepared in the same manner as in Example 1, except that diphenyleneoxide was used in preparing a polymeric electrolyte composition, instead of 3,4-methylenedioxyacetophenone.

EXAMPLE 11

A lithium secondary battery was prepared in the same manner as in Example 1, except that hydrogenated o-terphenyl was used in preparing a polymeric electrolyte composition, instead of 3,4-methylenedioxyacetophenone.

EXAMPLE 12

A lithium secondary battery was prepared in the same manner as in Example 1, except that biphenyl was used in preparing a polymeric electrolyte composition, instead of 3,4-methylenedioxyacetophenone.

EXAMPLE 13

A lithium secondary battery was prepared in the same manner as in Example 1, except that o-benzylbiphenyl was used in preparing a polymeric electrolyte composition, instead of 3,4-methylenedioxyacetophenone.

In the lithium secondary batteries according to Examples 1–13, charging/discharging characteristics depending on discharge current rate were tested in the following manner. The nominal capacity of each of the batteries was approximately 800 mAh, charging was performed at a constant current of 0.5 C under a constant voltage condition for 3 hours, and cut off at 4.2 V. Discharging was performed at constant currents of 0.2 C, 0.5 C, 1 C and 2 C, respectively, and cut off at 2.75 V.

Figure 1:
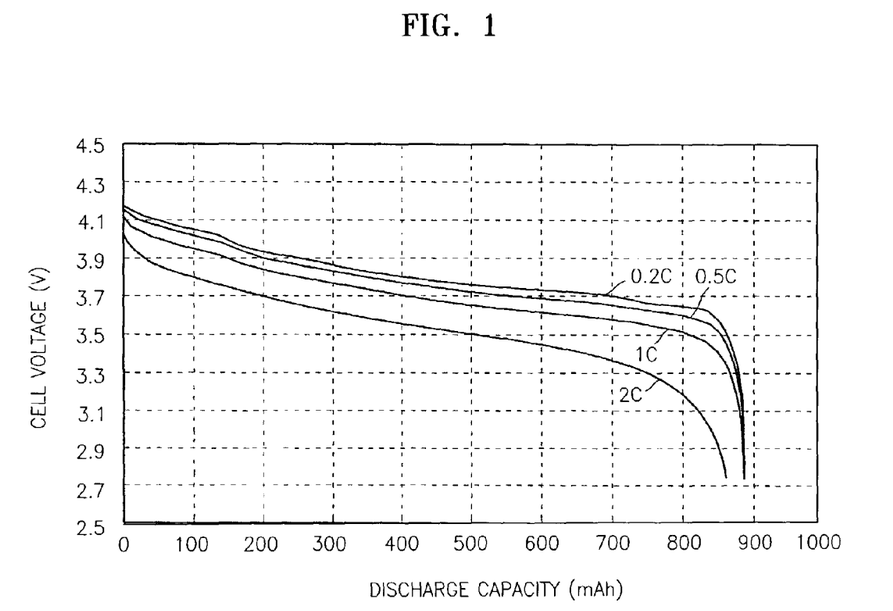
FIG. 1 is a graph showing discharge characteristics depending on the discharge current rate of a lithium secondary battery according to Example 1 of an embodiment of the present invention.

The test results showed that the charging/discharging characteristics of the lithium secondary batteries according to Examples 1–13 were very good. FIG. 1 shows charging/discharging characteristics of the lithium secondary battery according to Example 1. Referring to FIG. 1, it is confirmed that the lithium secondary battery according to Example 1 has good discharge characteristics even at a high-rate state of 2 C.

Then, safety tests of the lithium secondary batteries according to Examples 1–4 were performed. Here, the safety of a battery was evaluated by performing piercing tests during 1 C overcharge and 2 C overcharge to examine leak, flash, flame, smoke, fire, rupture or highest temperature, and then the battery subjected to the test was classified as one of levels L0–L4.

The safety test results are shown in Table 1, in which the term "Ref." is used to mean a battery prepared by using only a liquid electrolytic solution.

Figure 3:
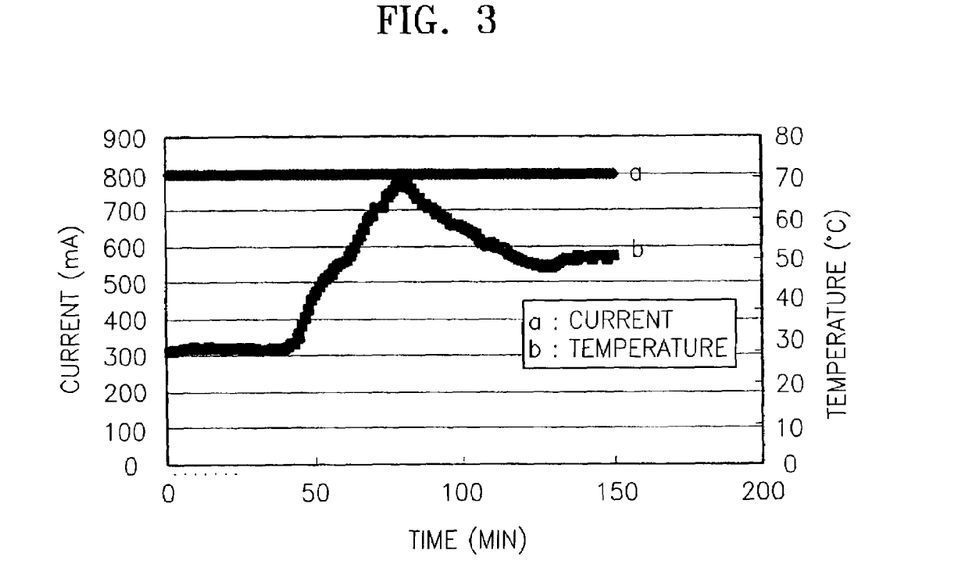

FIG. 3 is a graph showing a change in temperature and voltage and a change in temperature and current, in an overcharge state of a lithium secondary battery according to Example 7 of the present invention. Referring thereto, an increase in temperature is hindered in an overcharge state of a lithium secondary battery.

As described above, the present invention has the following advantages. The use of a polymeric sol electrolyte according to the present invention overcomes problems such as swelling or leakage, especially as compared to a liquid-type electrolytic solution. Also, the polymeric sol electrolyte has better ionic conductivity than a polymeric gel electrolyte. Thus, a lithium battery according to the present invention, the lithium battery using the polymeric sol electrolyte, has improved reliability.

Further, when the lithium battery according to the present invention is overcharged at 4.2 V or higher, an electrochemically polymerizable material existing in the polymeric sol electrolyte is subjected to polymerization to prevent heat runaway, which simplifies a separate protection circuit, leading to a reduction in manufacturing cost.

Although the present invention has been described with reference to a few embodiments thereof, the foregoing disclosure should be interpreted as illustrative only and it should be understood that various modifications and variations can be easily made by those skilled in the art without departing from the spirit and scope of the invention. Accordingly, a true scope and spirit of the invention should be defined by the following claims and equivalents thereof.

TABLE 1

| Item | | 1C overcharge | | | | | 2C overcharge | | | | |
|---|---|---|---|---|---|---|---|---|---|---|---|
| Sample | | Ref | Ex. 1 | Ex. 2 | Ex. 3 | Ex. 4 | Ref. | Ex. 1 | Ex. 2 | Ex. 3 | Ex. 4 |
| OCV prior to test (V) | | 4.18 | 4.18 | 4.18 | 4.18 | 4.18 | 4.17 | 4.17 | 4.17 | 4.17 | 4.17 |
| Test Result | Leak | ○ | X | X | X | X | ○ | X | X | X | X |
| | Flash | ○ | X | X | X | X | ○ | X | X | X | X |
| | Flame | ○ | X | X | X | X | ○ | X | X | X | X |
| | Smoke | ○ | X | X | X | X | ○ | X | X | X | X |
| | Fire | ○ | X | X | X | X | ○ | X | X | X | X |
| | Rupture | X | X | X | X | X | X | X | X | X | X |
| | Highest Temp. (° C.) | 46 | 56 | 48 | 47 | 34 | 98 | 90 | 89 | 55 | 87 |
| | Level | L4 | L0 | L0 | L0 | L0 | L4 | L0 | L0 | L0 | L0 |
| | Evaluation of state | Bad | Good | Good | Good | Good | Bad | Good | Good | Good | Good |

(OCV: open circuit voltage; Ref.: Reference; Ex.: Example; Temp.: Temperature)

It was confirmed from Table 1 that the lithium batteries prepared in Examples 1–4 were good in safety. Safety tests were also carried out on the lithium secondary batteries prepared in Examples 5–13 in the same manners as in Examples 1–4. According to the test results, the lithium secondary batteries prepared in Examples 5–13 had substantially the same levels of safety as those prepared in Examples 1–4.

Figure 2:
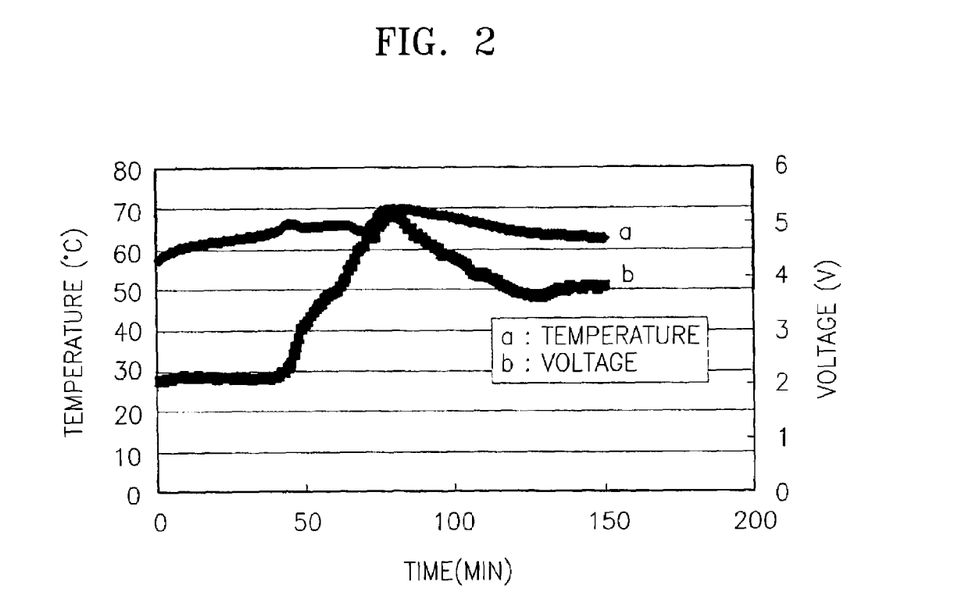
FIGS. 2 and 3 are graphs showing a change in temperature and voltage and a change in temperature and current, in an overcharge state of a lithium secondary battery according to Example 7 of an embodiment of the present invention.

FIG. 2 is a graph showing a change in temperature and voltage and a change in temperature and voltage, in an overcharge state of a lithium secondary battery according to Example 7 of the present invention. Referring thereto, polymerization is carried out at around 5 V to form a polymer on an electrode plate, so that overcharge is stopped. As a result, heat runaway does not occur.

What is claimed is:

1. A polymeric sol electrolyte comprising:
   a sol-forming polymer including a polymerized thermopolymerizable material; and
   an electrolytic solution consisting of a lithium salt and an organic solvent,
   wherein the thermopolymerizable material includes mixtures of epoxy-based resins and amine compounds and wherein the epoxy-based resins include epichlorohydrin-polyglycol epoxy resins, and the amine compounds include at least one selected from the group consisting of diethyl triamine and hexamethyldiamine.

2. The polymeric sol electrolyte according to claim 1, wherein a content of the thermopolymerizable material is in the range of 0.1 to 10 parts by weight, based on 100 parts by weight of the polymeric sol electrolyte.

3. The polymeric sol electrolyte according to claim 1, further comprising an electrochemically polymerizable material selected from the group consisting of 3,4-methylenedioxyacetophene, 1,4-benzodioxan-6-yl methylketone, o-terphenyl, p-benzylbiphenyl, p-benzylbiphenyl, diphenyleneoxide, hydrogenated o-terphenyl and biphenyl.

4. The polymeric sol electrolyte according to claim 3, wherein the electrochemically polymerizable material is polymerized at 4.2 to 6V.

5. The polymeric sol electrolyte according to claim 3, wherein a content of the electrochemically polymerizable material is in the range of 0.1 to 10 parts by weight, based on 100 parts by weight of the polymeric sol electrolyte.

6. The polymeric sol electrolyte according to claim 1, wherein a content of the electrolytic solution is in the range of 50 to 99.9 parts by weight, based on 100 parts by weight of the polymeric sol electrolyte.

7. The polymeric sol electrolyte according to claim 1, wherein said sol-forming polymer is formed by impregnating an electrolytic solution in a polymer and has a weight-average molecular weight of 500 to 100,000.

8. A lithium battery comprising:
a cathode;
an anode; and
a polymeric sol electrolyte interposed between said cathode and said anode and having a sol-forming polymer, including a polymerized thermopolymerizable material, and an electrolytic solution consisting of a lithium salt and an organic solvent,
wherein the thermopolymerizable material includes mixtures of epoxy-based resins and amine compounds and wherein the epoxy-based resins include epichlorohydrin-polyglycol epoxy resins, and the amine compounds include at least one selected from the group consisting of diethyl triamine and hexamethyldiamine.

9. The lithium battery according to claim 8, wherein a content of the thermopolymerizable material is in the range of 0.1 to 10 parts by weight, based on 100 parts by weight of the polymeric sol electrolyte.

10. The lithium battery according to claim 8, wherein said polymeric sol electrolyte further comprises an electrochemically polymerizable material selected from the group consisting of 3,4-methylenedioxyacetophene, 1,4-benzodioxan-6-yl methylketone, o-terphenyl, o-benzylbiphenyl, p-benzylbiphenyl, diphenyleneoxide, hydrogenated o-terphenyl and biphenyl and polymerized at the maximum operating voltage or higher.

11. The lithium battery according to claim 10, wherein the electrochemically polymerizable material is polymerized at 4.2 to 6 V.

12. The lithium battery according to claim 10, wherein a content of the electrochemically polymerizable material is in the range of 0.1 to 10 parts by weight, based on 100 parts by weight of the polymeric sol electrolyte.

13. The lithium battery according to claim 8, wherein a content of the electrolytic solution is in the range of 50 to 99.9 parts by weight, based on 100 parts by weight of the polymeric sol electrolyte.

14. The lithium battery according to claim 8, further comprising a separator interposed between said cathode and said anode, said separator made of microporous polyolefin.

15. The lithium battery according to claim 14, wherein the microporous polyolefin is polypropylene, polyethylene, or a combination thereof.

* * * * *

UNITED STATES PATENT AND TRADEMARK OFFICE
CERTIFICATE OF CORRECTION

PATENT NO. : 7,078,131 B2 Page 1 of 1
APPLICATION NO. : 10/202060
DATED : July 18, 2006
INVENTOR(S) : Hyung-gon Noh It is certified that error appears in the above-identified patent and that said Letters Patent is hereby corrected as shown below:

Column 11, line 5, change "p-benzylbiphenyl" to --o-benzylbiphenyl--

Signed and Sealed this

Twelfth Day of December, 2006

JON W. DUDAS
*Director of the United States Patent and Trademark Office*